United States Patent [19]
Scott

[11] Patent Number: 4,703,866
[45] Date of Patent: Nov. 3, 1987

[54] RECTANGULAR WOODEN RECEPTACLE

[76] Inventor: Alan Scott, 307 Third Ave., Carnegie, Pa. 15106

[21] Appl. No.: 829,202

[22] Filed: Feb. 14, 1986

[51] Int. Cl.⁴ .......................... B65D 6/16; B65D 43/02
[52] U.S. Cl. .......................................... 217/88; 217/4; 217/12 R; 217/72; 217/76; 217/65; 217/96
[58] Field of Search ................. 220/4, 12 R, 13, 43 R, 220/72, 76, 88, 96, 65, 78, 79, 5 R, 5 A

[56]  References Cited
U.S. PATENT DOCUMENTS

| | | | |
|---|---|---|---|
| 25,581 | 9/1859 | Perkins | 217/12 R |
| 1,803,127 | 4/1931 | O'Connell | 217/78 |
| 3,259,055 | 7/1966 | Labs | 217/12 R |
| 3,450,294 | 6/1969 | Benson | 220/5 A |
| 3,456,827 | 7/1969 | Wakeem | 217/72 |
| 3,667,639 | 6/1972 | Pfeil | 217/96 |

FOREIGN PATENT DOCUMENTS 79415  10/1955  Netherlands ...................... 217/12 R Primary Examiner—George E. Lowrance
Attorney, Agent, or Firm—William J. Ruano

[57] ABSTRACT

A rectangular barrel having four flat sides. Each side comprises a plurality of board of substantially square cross section. Each board has right angular grooves extending laterally near the end and has a tongue on one edge and a groove on the other edge which interfit to form each side. Both end of the barrel are square with tongues extending into the right angular grooves of the boards and partially into the tongues and grooves of all the boards for sealing the ends of the barrel.

1 Claim, 4 Drawing Figures

RECTANGULAR WOODEN RECEPTACLE

BACKGROUND OF THE INVENTION

Rounded barrels have generally been used for ageing alcoholic beverages. They have not carried a maximum volume of beverage when stacked. Also, they required frequent readjustment of the staves. Their curved shape is difficult to maintain.

SUMMARY OF THE INVENTION

The present invention comprises a rectangular barrel that overcomes the above-mentioned disadvantages.

DESCRIPTION OF THE PREFERRED EMBODIMENT

The receptacle is made of kiln dried lumber of a suitable type for ageing alcoholic beverages. In general, the larger the receptacle, the thicker the boards used. Warped lumber or lumber with knots should not be used. The boards forming the sides, top and bottom and ends are cut straight. There are no curves to be cut in order to build the receptacle.

The receptacle consists of four sides and two ends which are square. The length of the receptacle is limited only by the length of the boards available. After the side boards 3 have been cut to the desired length and thickness, tongues 1 and grooves 2 are cut into them. These tongues and grooves may be cut with a router. Throughout the building of the receptacle all tongues are made longer than their respective grooves are deep. This insures that the ends of the tongues 1 are seated flush on the bottoms of their respective grooves 2 and will form a tight seal when banded.

It is suggested that the tongues be longer than their grooves are deep by at least ⅛ of an inch. It is also suggested that the tongues and grooves be at least ⅓ the thickness of the board into which they are cut so that they do not crack when the metal bands are tightened.

Figure 3:
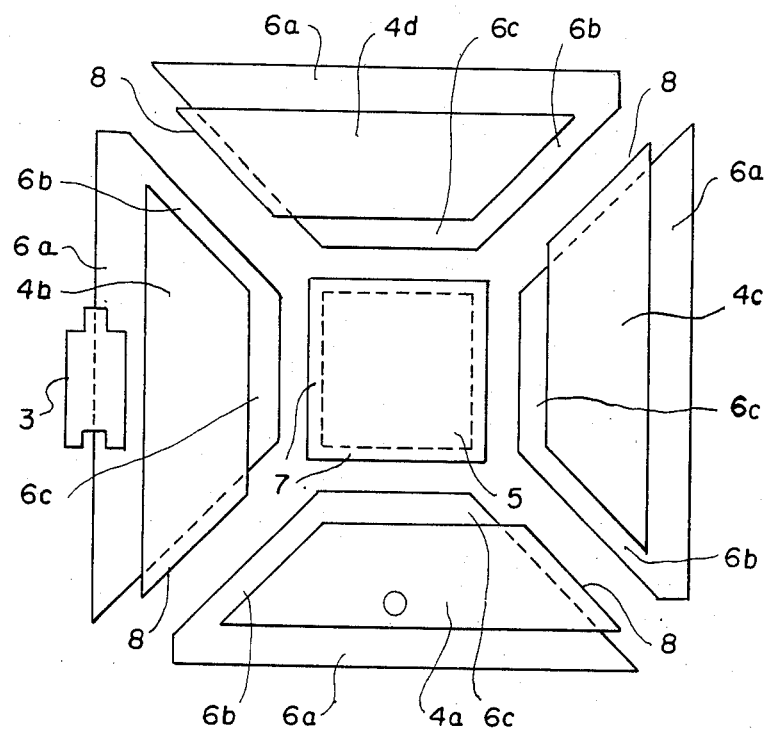
FIG. 3 is an exploded view of the end of the receptacle showing tongues and grooves necessary to make a square end.
Figure 4:
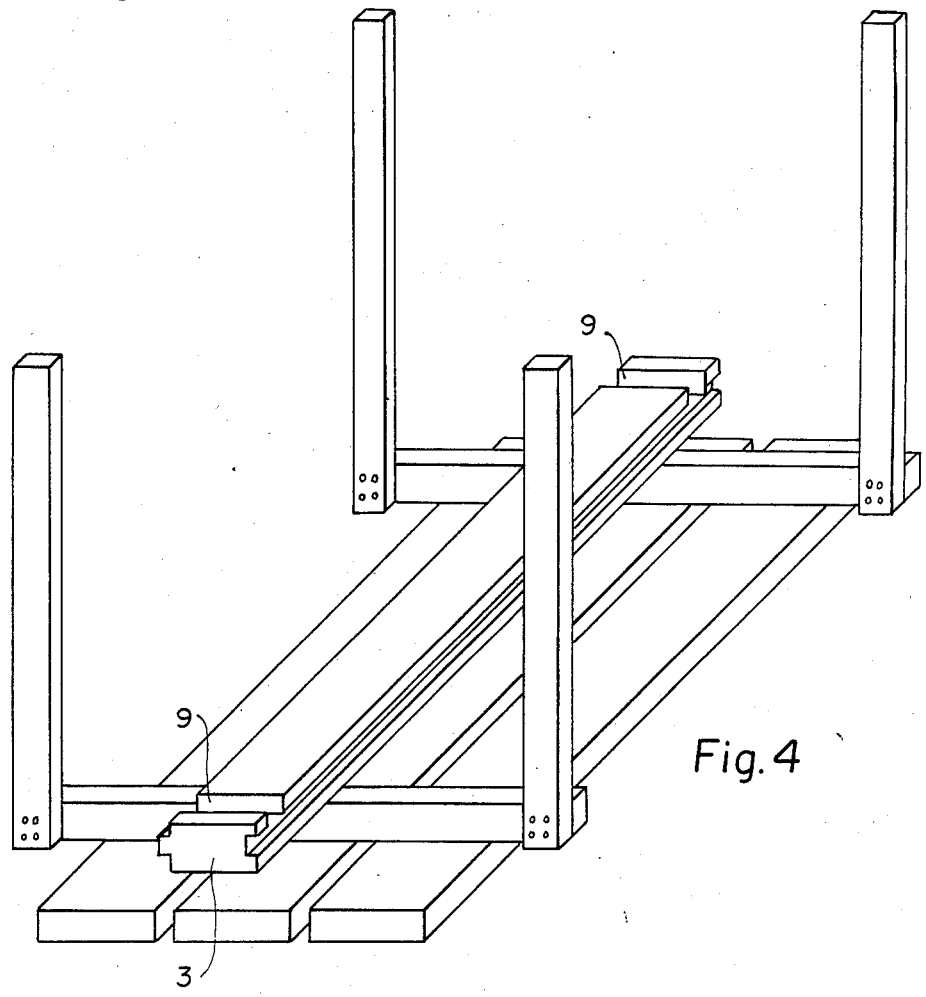
FIG. 4 is a three-dimensional view of an assembly cradle with a bottom board in place.

The ends of the receptacle consists of five blocks of wood (4a, 4b, 4c, 4d and 5), cut as shown in FIG. 3. Four of the wood boards (4a, 4b, 4c and 4d) are identical in shape and size, and it is suggested that when cutting these boards to the proper shape, that they be clamped together and cut with a radial arm saw all at one time for the sake of accuracy. The fifth board (5) is a square and has a groove 7 cut into its circumference. The four identical boards 4a, 4b, 4c, and 4d have tongues 6a, 6b, and 6c cut on three sides and a groove 8 cut into the fourth side. When the inside tongues 6c are fitted into the grooves 7 cut into board 5, the five boards together form a square end of the receptacle with a tongue 6a cut into the circumference of the square end.

Figure 1:
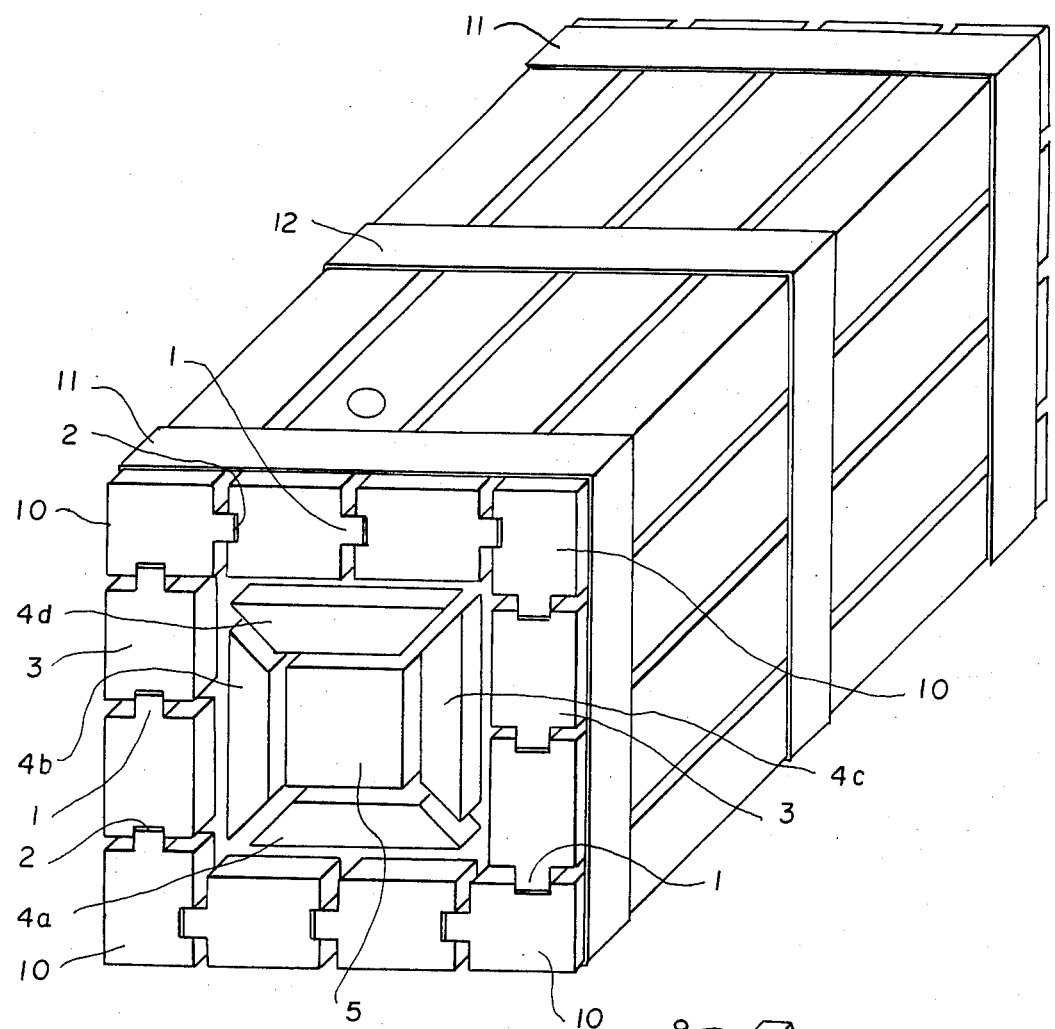
FIG. 1 is a three-dimensional drawing of the completed receptacle with the metal bands in place.
Figure 2:
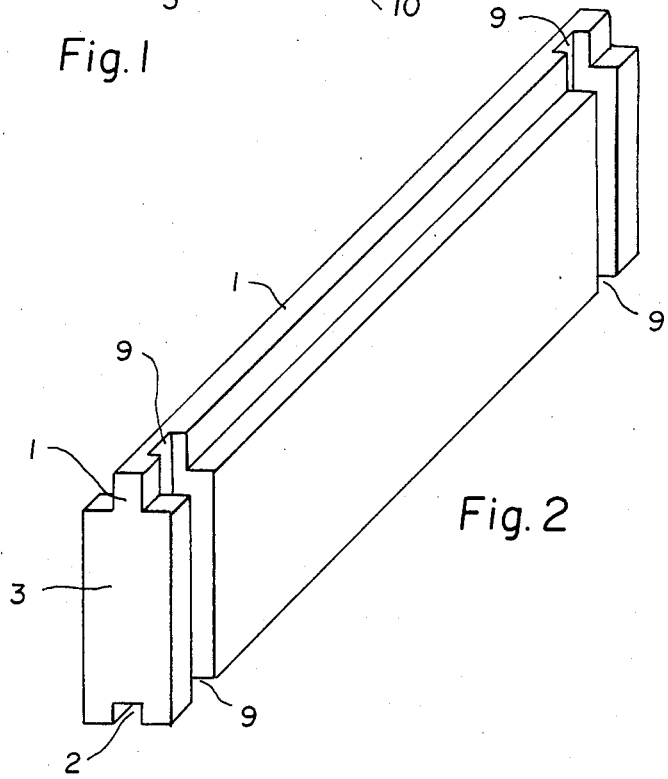
FIG. 2 is a three-dimensional drawing of a side (or top or bottom) board as seen from the inside of the receptacle.

Before the side, bottom and top boards can be assembled in the cradle, a groove 9 must be cut laterally near the end of each board. This groove is necessary to accommodate tongue 6a of the square ends of the receptacle. It is important that this groove 9 must pass through a part of tongue 1 and groove 2 at a right angle to the length of the board, as shown in FIG. 2. This is what seals the end of the receptacle after it has been assembled and banded. This groove 9 may be cut into the side, bottom and top boards with a router, but the corner boards 10 will require the use of a drill press equipped with a mortise chisel and drill bit.

After all the boards have had groove 9 cut into them, the bottom boards may be placed in the cradle followed by the side boards, and the grooves aligned. Next, the bottom-most board 4a of the square end boards may be put in place,—its tongue 6a fitted into the aligned grooves of the bottom boards. Board 4b and 4c of the square end boards may then be fitted into the aligned grooves of the side boards. Block 5 may be fitted next followed by board 4d of the square end boards. The top boards may then be put in place. This completes the assembly of the receptacle. The entire structure is designed so that when assembled, the tongues of the various boards seat flush on the bottom of their respective grooves, and the various tongues are longer than their respective grooves are deep.

The receptacle is now ready for banding. Brass, stainless steel, or other non-rusting metal may be used for the bands. The bands 11 are placed around the circumference of the receptacle, directly over the square end boards and tightened so that the tongues are compressed tightly against the bottom of the grooves, thus creating a good seal. Additional bands 12 may be placed around the receptacle between the two end bands at various distances from the end bands to insure that the receptacle does not leak in the middle.

The receptacle is more easy to build and is more space efficient than a conventional barrel.

At least three boards should be used per side to allow for compression of tongues during banding.

While I have illustrated and described a single specific embodiment of my invention, it will be understood that this is by way of illustration only and that various changes and modifications may be contemplated in my invention within the scope of the following claims.

I claim:

1. A rectangular barrel having four flat sides, each side comprising a plurality of boards of substantially square cross-section, each board having a tongue on one edge and a groove on another edge which interfit an adjoining board to form the four sides of the barrel, said tongues being of slightly greater length than the depths of said grooves, each board having an internal groove extending at right angles and close to its ends and extending through a portion of said tongues, both ends of said barrel comprising a square board with a perimetrical groove surrounded by four adjoining 45° mitred identical trapezoidal side boards having inwardly extending tongues fitting into said perimetrical groove, said last mentioned tongues being of slightly greater length than said last mentioned perimetrical groove, each of said mitred identical trapezoidal side boards having an external tongue fitted into said internal grooves and having tongue and groove side connections with the sides of adjoining mitred identical trapezoidal side boards, and bands surrounding said four flat sides, whereby tensioning of said bands assure a tight seal between all of said tongues and grooves and whereby the barrel is devoid of curved corners.

* * * * *